Oct. 6, 1931.  A. S. JAMES  1,826,076
AIRCRAFT
Filed Aug. 4, 1930  3 Sheets-Sheet 3
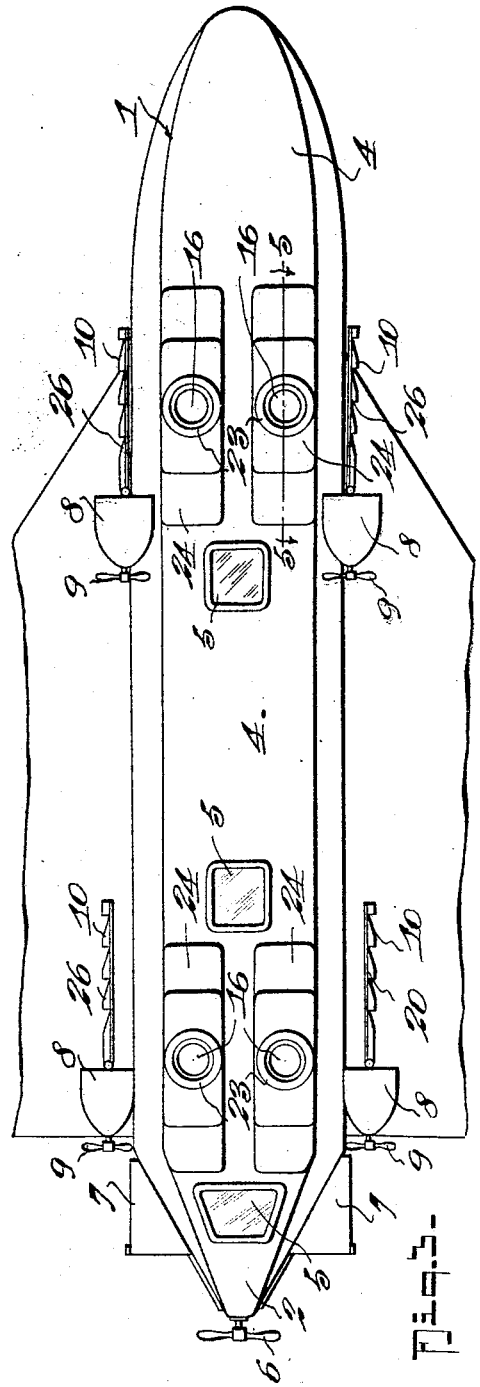
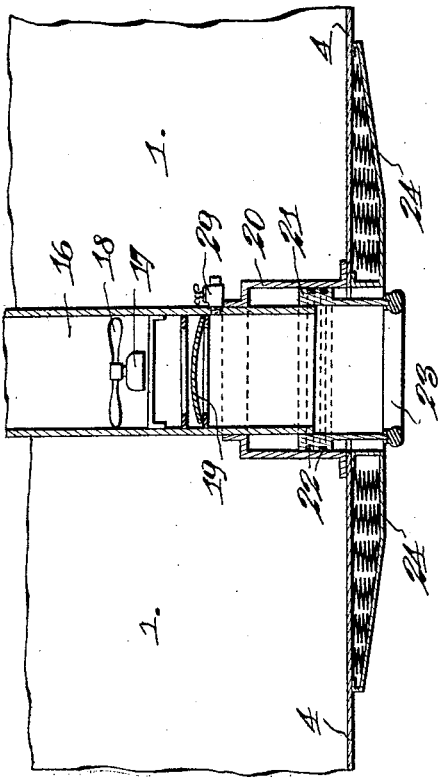
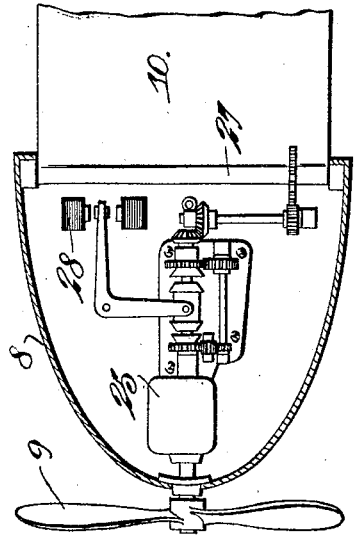
INVENTOR
Albert S. James.
BY
ATTORNEY Patented Oct. 6, 1931

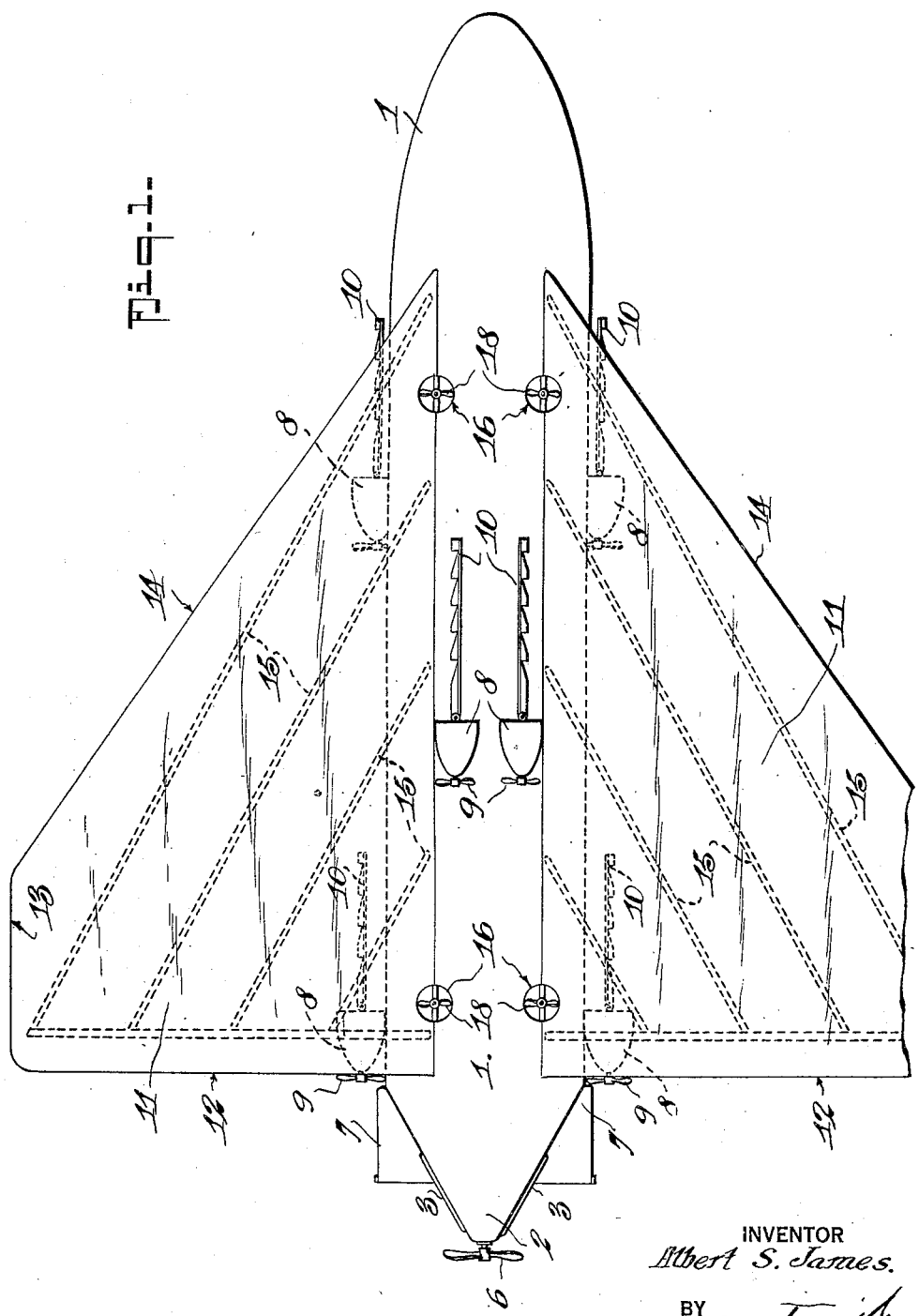

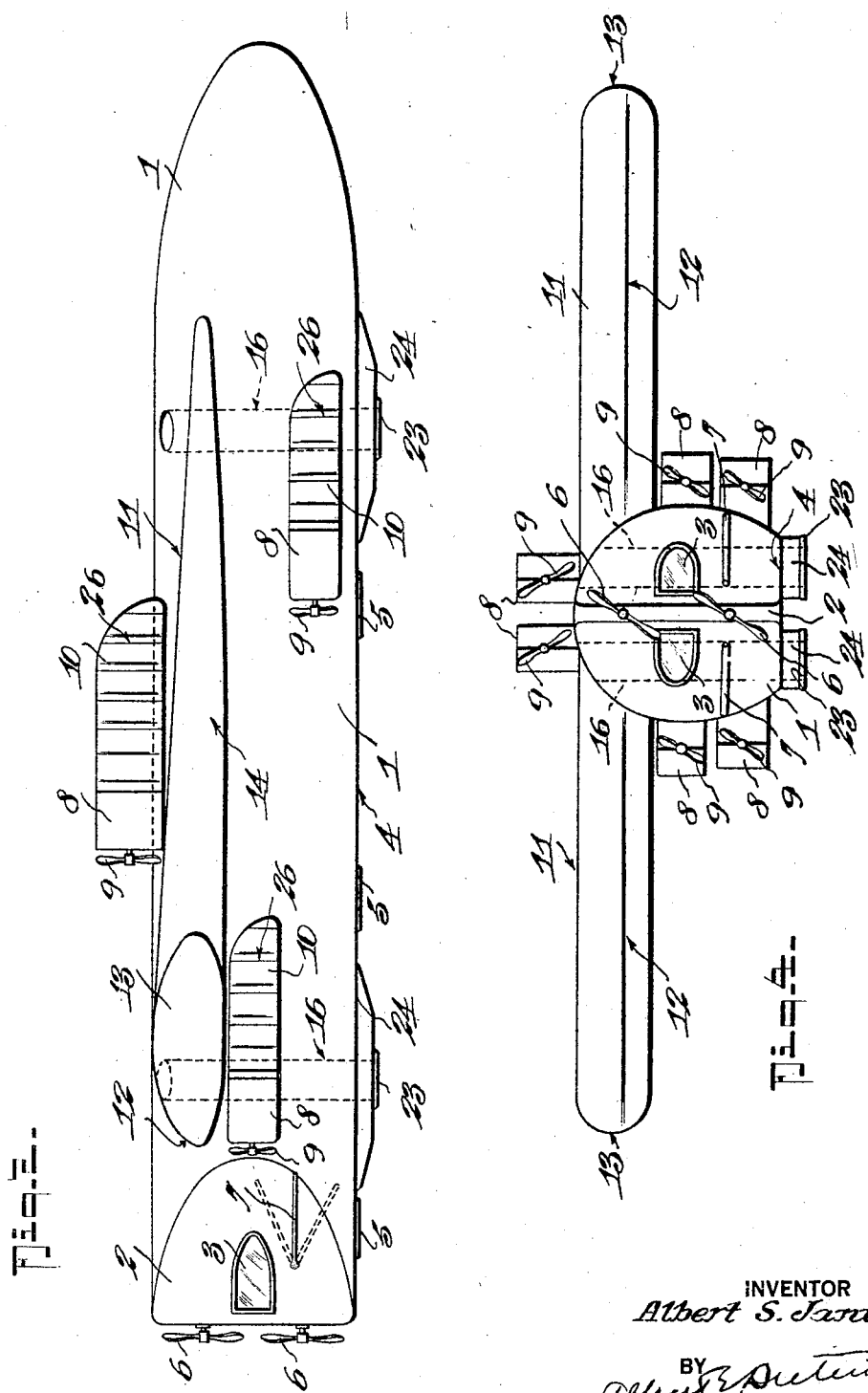

1,826,076

UNITED STATES PATENT OFFICE

ALBERT SHEPHARD JAMES, OF EUREKA, CALIFORNIA

AIRCRAFT

Application filed August 4, 1930. Serial No. 472,993.

My invention which has relation to the art of aerial navigation, particularly has for an object to provide an air craft of such construction and design that it may be used for the transporting of considerable weights with a maximum of safety and speed relatively to the load carried.

Further it is an object to provide an air craft in the form of an airplane which, however, is preferably provided with buoyant media such, for example, as disclosed in Patent No. 1,766,906, granted June 24, 1930.

Further the invention has for an object to provide an air craft which may remain poised in the air over any desired locality and landed on top of flat buildings, if desired, and secured to the landing places by vacuum or suction means while loading and unloading.

Further it is an object to provide the craft with air-vane blades for the purpose of steering as well as for the purpose of stopping the craft.

Further it is an object to provide suitable cushioning means in combination with the suction tubes, for protecting against the shock of landing or taking the bump or landing force of the craft as it comes down (through the action of vacuum tubes) to the ground, floor, or roof space.

Further it is an object to provide a craft whose body has a flat bottom for resting on a flat landing place which may be either the landing field or the flat roof of a building.

Other objects will in part be obvious and in part be pointed out hereinafter.

To the attainment of the aforesaid objects my invention consists in the novel features of construction and combination, connection and arrangement of parts, hereinafter more fully described, and then pointed out in the appended claims.

In the drawings:

Figure 1 is a plan of an aircraft embodying my invention.

Figure 2 is a side elevation thereof.

Figure 3 is an inverted plan of the same.

Figure 4 is a front elevation of the same.

Figure 5 is a detail vertical section on the line 5—5 of Figure 3.

Figure 6 is a detail diagrammatic view of the vane-brake operating mechanism.

In the drawings, in which like numerals of reference indicate like parts in all of the figures, 1 represents the body of the machine which is preferably of an elongated or cigar shape but provided at the front end with forwardly converging vertical walls constituting a prow 2 of V-shape in plan, the prow being provided with observation windows 3, as indicated.

The body 1 has a flat bottom 4 which is also provided with observation windows 5.

The main propellers for navigating the craft horizontally are designated by 6 and are preferably located at the front of the prow 2. At each side of the prow are elevators 7, the purpose of which is to cause the craft to ascend and descend while moving forwardly.

Auxiliary motor housings 8 are located on the sides of the body, front and back and on the top of the body. These housings contain suitable motor mechanism for driving the auxiliary propellers 9.

11 are the wings on the craft which project to either side of the body and have straight front edges 12, short straight ends 13, and rearwardly converging edges 14. The wings are made hollow and are provided with suitable braces 15, as shown. The wings, as well as a portion of the body, may contain the buoyant chambers of the craft disclosed in my patent aforesaid; but as such constitutes no part of the present invention illustration thereof is thought to be unnecessary.

16 designates a set of vertical tubes (the number of which will depend upon the size of the craft). These tubes contain motors 17 and propellers 18 through the medium of which air currents can be passed upwardly through the tubes, there being back check valves 19 provided in the tubes to prevent air currents passing downwardly through the tubes, and for the purpose of holding the suction or vacuum by which the craft is held down to its landing surface. The tubes 16 at their lower ends are surrounded by cylinders 20 in which telescopic pistons 21 are mounted to embrace the lower ends of the tubes 16 and provide air cushions to reduce the shock when the craft lands. The pistons have suitable packing rings 22. Surrounding the pistons 21 are mattresses or cushions 24 of any approved construction as, for instance, coil springs enclosed in a suitable casing, and these mattresses 24 are apertured to permit the shanks of the pistons 21 to pass through. The lower ends of the shanks of the pistons 21 carry rubber rings or other suitable air sealing material 23 so that when the craft is resting on a plane surface and the propellers 18 are in action a suction is produced beneath those propellers which will cause the craft to be sealed to the landing surface. Should the motors, for any reason, cease functioning after the vacuum or negative pressure has been established, the valves 19 will seat and hold the "vacuum" for a time, at least.

The vanes 10, which are pivotally mounted on the motor housings 8, have stepped surfaces 26 to catch the air and act as a restraining force to slow down the movement of the craft. Also, by manipulating certain of the vanes 10 the craft may be steered laterally in any direction desired.

Any suitable mechanism driven by the motors which drive the auxiliary propellers 9 may be provided for moving the vanes 10. For example, a transmission gear mechanism from the motors 25 to the axles 27 of the vanes 10, including a magnetic clutch and reversing mechanism 28 may be used, such mechanism being under the control of the navigator.

So far as described, when it is desired to effect a landing, the forward propelling motors are stopped, thus rendering the propellers 6 and 9 inoperative. The motors 17 are then started and by reason of the establishment of the negative pressure below the propellers 18 and the establishment of a positive pressure above, the craft will be brought vertically downwardly and landed where desired. Upon coming in contact with the landing surface a partial vacuum will be produced in the tubes 16 beneath the propellers 18 which then act as suction cups or tentacles to hold the craft to the surface on which it has landed.

When it is desired to release the craft the motors 18 are slowed down gradually, thus preventing the valve 10 from seating tight. The suction effect is dissipated. Upon starting the navigating propellers the craft will leave the surface to which it has been adhering. Should it be found that the valves 19 do not release by a gradual slowing down of the propellers 18 the propellers may be stopped entirely and after a time the leakage around the rings 23 will soon break the vacuum and permit the craft to fly away, or a relief valve 29 may be provided in the tubes 16 that can be operated manually by attendants on the ground to release the vacuum when the craft is about ready to take off.

From the foregoing description, taken in connection with the accompanying drawings, it is thought the complete construction, operation and advantages of my invention will be readily understood by those skilled in the art.

What I claim is:

1. In air craft, the combination with the buoyant body, of vertical air tunnels through the same, air propelling means within the tunnels for forcing the craft toward the ground by causing a negative pressure at the bottom of the tunnels and a positive pressure at the top, and means at the bottom of the tunnels for sealing the same to a flat landing place.

2. In air craft, the combination with the buoyant body, of vertical air tunnels through the same, air propelling means within the tunnels for forcing the craft toward the ground by causing a negative pressure at the bottom of the tunnels and a positive pressure at the top, means at the bottom of the tunnels for sealing the same to a flat landing place, and a back check valve in the tunnels below the air propelling means for holding the negative pressure when the vehicle has landed.

3. In air craft, a body with wings, said body having a tapered nose, elevators mounted on the sides of the nose, propellers mounted at the front of the nose, laterally movable air brake vanes mounted on the body, auxiliary means and propeller mechanisms mounted adjacent said vanes, said body having a flat bottom, means for causing the craft to approach a landing place bodily vertically downward, and shock absorbing means on the bottom of the body.

4. In air craft, a body with wings, said body having a tapered nose, elevators mounted on the sides of the nose, propellers mounted at the front of the nose, laterally movable air brake vanes mounted on the body, auxiliary motors and propeller mechanisms mounted adjacent said vanes, said body having a flat bottom, means for causing the craft to approach a landing place bodily vertically downward, and shock absorbing mattresses on the bottom of the body.

5. In air craft, a body with wings, said body having a tapered nose, elevators mounted on the sides of the nose, propellers mounted at the front of the nose, laterally movable air brake vanes mounted on the body, auxiliary motors and propeller mechanisms mounted adjacent said vanes, said body having a flat bottom, and means for causing the craft to approach a landing place bodily vertically downward, and shock absorbing means on the bottom of the body, said causing means having in cooperation therewith means to seal the craft to the surface on which it has landed.

6. In air craft, a body with wings, said body having a tapered nose, elevators mounted on the sides of the nose, propellers mounted at the front of the nose, laterally movable air brake vanes mounted on the body, auxiliary motors and propeller mechanisms mounted adjacent said vanes, said body having a flat bottom, and means for causing the craft to approach a landing place bodily vertically downward, and shock absorbing means on the bottom of the body, said causing means having in cooperation therewith means to seal the craft to the surface on which it has landed, said shock absorbing means being in cooperative association with said sealing means.

7. In air craft of the buoyant type, a body having a flat bottom for landing purposes, pneumatic means causing said body to approach the landing field in a direction vertically downward, means cooperating with said causing means for making said body to adhere to the landing surface.

8. In air craft of the buoyant type, a body having a flat bottom for landing purposes, pneumatic means causing said body to approach the landing field in a direction vertically downward, means cooperating with said causing means for making said body to adhere to the landing surface, and shock absorbing means beneath said body in cooperation with said causing means.

9. In air craft, a buoyant body, means to impel it through the air, means to cause said body to approach the earth while on an even keel by vertically downward movement, said last named means comprising air tunnels extending vertically through the craft, motors and propellers in said tunnels to cause a suction in the tunnel at the bottom, and means at the bottom of each tunnel for effecting an approximately air-tight contact between the tunnel and the surface on which the craft has been landed.

10. In air craft, a buoyant body, means to impel it through the air, means to cause said body to approach the earth while on an even keel by vertically downward movement, said last named means comprising air tunnels extending vertically through the craft, motors and propellers in said tunnels to cause a suction in the tunnels at the bottom, means at the bottom of each tunnel for effecting an approximately air-tight contact between the tunnel and the surface on which the craft has been landed, and back check valves in the tunnel beneath the propellers for holding the negative pressure while the craft is at rest on the landing surface.

11. In air craft, a buoyant body, means to impel it through the air, means to cause said body to approach the earth while on an even keel by vertically downward movement, said last named means comprising air tunnels extending vertically through the craft, motors and propellers in said tunnels to cause a suction in the tunnels at the bottom, means at the bottom of each tunnel for effecting an approximately air-tight contact between the tunnel and the surface on which the craft has been landed, back check valves in the tunnel beneath the propellers for holding the negative pressure while the craft is at rest on the landing surface, and means for relieving the negative pressure to release the craft.

12. In air craft, a buoyant body, means to impel it through the air, means to cause said body to approach the earth while on an even keel by vertically downward movement, said last named means comprising air tunnels extending vertically through the craft, motors and propellers in said tunnels to cause a suction in the tunnels at the bottom, and means at the bottom of each tunnel for effecting an approximately air-tight contact between the tunnel and the surface on which the craft has been landed, said last named means comprising a telescoped piston having sealing rings and telescopically mounted at the lower end of said tunnel.

13. In air craft, a buoyant body, means to impel it through the air, means to cause said body to approach the earth while on an even keel at vertically downward movement, said last named means comprising air tunnels extending vertically through the craft, motors and propellers in said tunnels to cause a suction in the tunnels at the bottom, means at the bottom of each tunnel for effecting an approximately air-tight contact between the tunnel and the surface on which the craft has been landed, and a valve in said tunnel for the purposes described.

14. In air craft, a buoyant body, means to impel it through the air, means to cause said body to approach the earth while on an even keel by vertically downward movement, said last named means comprising air tunnels extending vertically through the craft, motors and propellers in said tunnels to cause a suction in the tunnels at the bottom, means at the bottom of each tunnel for effecting an approximately air-tight contact between the tunnel and the surface on which the craft has been landed, back check valves in the tunnel beneath the propellers for holding the negative pressure while the craft is at rest on the landing surface, and a valve in said tunnel for the purposes described.

ALBERT SHEPHARD JAMES.